(12) United States Patent
Kanderski et al.

(10) Patent No.: US 9,982,171 B2
(45) Date of Patent: May 29, 2018

(54) HOT MELT ADHESIVE WITH FUNCTIONALIZED METALLOCENE CATALYZED POLYOLEFINS

(71) Applicant: Bostik, Inc., Wauwatosa, WI (US)

(72) Inventors: Monina D. Kanderski, Milwaukee, WI (US); Michael D. Vitrano, West Allis, WI (US)

(73) Assignee: Bostik, Inc., Wauwatosa, WI (US)

( * ) Notice: Subject to any disclaimer, the term of this patent is extended or adjusted under 35 U.S.C. 154(b) by 0 days. days.

(21) Appl. No.: 14/497,175

(22) Filed: Sep. 25, 2014

(65) Prior Publication Data

US 2015/0087760 A1 Mar. 26, 2015

Related U.S. Application Data

(60) Provisional application No. 61/960,713, filed on Sep. 25, 2013.

(51) Int. Cl.
*C09J 123/20* (2006.01)
*C08K 5/134* (2006.01)
*C09J 123/08* (2006.01)

(52) U.S. Cl.
CPC ............ *C09J 123/20* (2013.01); *C08K 5/1345* (2013.01); *C09J 123/0815* (2013.01); *C08L 2314/06* (2013.01)

(58) Field of Classification Search
CPC ...... C08L 2314/06; C08L 51/06; C08L 91/00; C09J 123/0815; C09J 2423/04; C09J 2491/00
See application file for complete search history.

(56) References Cited

U.S. PATENT DOCUMENTS

| 5,763,516 A | 6/1998 | Godfrey |
| 7,378,481 B1 * | 5/2008 | Gong .................... C08F 255/02 526/160 |
| 2009/0203847 A1 | 8/2009 | Ellis et al. |
| 2011/0021103 A1 * | 1/2011 | Alper ....................... B32B 5/26 442/329 |
| 2014/0079897 A1 * | 3/2014 | Cheung ..................... C09J 4/06 428/34.3 |

OTHER PUBLICATIONS

PCT International Search Report dated Dec. 8, 2014 for corresponding PCT International Application No. PCT/US2014/057540.
PCT Written Opinion of the ISA dated Dec. 8, 2014 for corresponding PCT International Application No. PCT/US2014/057540.
PCT International Preliminary Report on Patentability dated Apr. 7, 2016 for the corresponding PCT International Application No. PCT/US2014/057540.

\* cited by examiner

*Primary Examiner* — Wenwen Cai
(74) *Attorney, Agent, or Firm* — Christopher R. Lewis

(57) ABSTRACT

A hot melt adhesive composition containing a functionalized polymer, namely, a metallocene catalyzed polyolefin elastomer grafted with maleic anhydride, together with a non-functionalized secondary polymer, namely, a metallocene catalyzed random or block polyolefin elastomer having a melt index equal to or greater than 15, a first tackifying resin having a softening point of at least 95° C., and a wax. The composition may optionally include an aromatic reinforcing resin having a softening point equal to or higher than 115° C., and a plasticizer. These hot melts provide superior hot tack, excellent adhesion, flexibility, and heat resistance above 150° F. in applications such as rigid packaging, hot fill packaging, and bottle labeling.

9 Claims, No Drawings

HOT MELT ADHESIVE WITH FUNCTIONALIZED METALLOCENE CATALYZED POLYOLEFINS

BACKGROUND OF THE INVENTION

The invention is based on the use of metallocene catalyzed polyolefin elastomer grafted with maleic anhydride (MAH) in hot melt adhesives for applications that require increased hot tack, adhesion, flexibility, and heat resistance above 150° F.

Hot melt adhesives are used in packaging applications where it is often required to adhere to low porosity paper or cardboard which are covered with a wide range of inks, coatings, and overprint lacquers for functionality or aesthetic purposes. In other instances they are used to bond low surface energy substrates such as polyethylene (PE) or polypropylene (PP) films, and to boxes or substrates that vary in physical characteristics such as the rigidity, density, and chemical make-up due to high level of recycled material. These type of substrates are very difficult to bond to. As a result, adhesives must be formulated to overcome these obstacles. Consequently, adhesive formulators are continuously evaluating new materials and novel formulation strategies in order to develop an adhesive with the broadest possible application window. An adhesive's application window is defined as an adhesive's ability to overcome an application's deficiencies and/or manufacturing variables. The current invention details a novel way a hot melt formulator can balance the adhesive's application window without adversely affecting the high temperature environmental resistance and adhesion to the substrates.

Historically, adhesive formulators have struggled to formulate a crystalline, polyolefin based adhesive or an EVA based adhesive that could provide heat environmental resistance above 150° F. while maintaining the hot tack and/or cold temperature performance. In order to increase the heat resistance over 150° F., typically a styrenic block copolymer based polymer is used. In particular they have fully hydrogenated midblocks, such as Kraton G1657. They can be used to increase the heat resistance properties of the adhesive while maintaining adequate compatibility with the polyolefin base polymer. Another approach is to use a high level of polymer (for example, greater than 30%) to increase the heat resistance while maintaining the cold temperature resistance. However, these approaches drive the viscosity of the adhesive significantly higher and it becomes unsuitable for the intended applications.

Adhesives have been used for years to label both glass and plastic bottles. Plastic bottles containing carbonated beverages are particularly challenging. After bottling, carbonated beverages will cause plastic bottles to expand. The label system needs to accommodate this expansion. The adhesive used to adhere the label onto the plastic bottle also needs to accommodate this expansion.

Paper labels are rigid and will not expand. Typically, hard, glassy adhesives are used to bond the paper label to glass bottles. When paper labels are used on plastic bottles, the adhesive needs to resist creep, and thus prevent the label from "flagging" (partial delamination of the label overlap from the bottle). However, plastic labels are flexible and will expand and are generally more difficult to adhere to than the paper labels. Typically, softer, elastic, tacky adhesives are used on plastic film labels. The adhesive used to adhere plastic labels needs to be of sufficient tack to adhere the label to the bottle, and strong enough to withstand the expansion of the label and the bottle. In this type of application, the adhesive needs to have a greater internal strength than that of the label. The adhesives' increased internal strength forces the label to stretch and expand, maintaining the bond at the label overlap. Should the adhesive stretch or creep a gap will appear between the leading and trailing edge of the label on the bottle at the label overlap.

Plastic labels are becoming more rigid in order to support increased graphics and facilitate the printing process. Additionally, plastic bottles are experiencing an overall gauge reduction to achieve cost savings and meet manufacturers' "green" initiatives. Also, clear labels are also entering the market place. These labels, due to their base composition, have greater tensile strength than previous plastic labels. The greater tensile strength of these labels resists stretching, causing existing adhesives to creep, resulting in a labeling failure (the label's leading and trailing edges separate). Furthermore, some plastic film labels are susceptible to oil migration from the adhesive into the label. This migration causes aesthetically unpleasing wrinkles.

Adhesive formulators are struggling to develop adhesives that adhere well to these higher tensile strength plastic labels, and do not exhibit oil migration from the adhesive into the label at 140° F. This invention details a novel way a hot melt formulator can impart low viscosity, superior adhesion, increased creep resistance, and no oil migration in hot melt bottle labeling adhesives, without compromising other properties.

There has been a need for hot melt adhesives with increased temperature resistance for "hot fill" applications. This is where a liquid food product (juice, tea, etc.) is heated to a temperature of about 190° F. to sterilize it. The liquid is placed in a plastic or glass container while hot which serves to sterilize the package as well. It is immediately capped, which helps provide a vacuum as the liquid cools. Once capped it is quickly cooled to minimize the effect of heat on the liquid. The label may be applied before the container is completely cooled and therefore requires increased temperature resistance so that the label does not detach from the bottle.

There is also a need for "hot fill" applications involving carton sealing. Besides hot fill label applications, there are other times when hot materials are put into a shipping container while still hot. This can cause the hot melt adhesive to soften to the point that the bond delaminates. Clearly, there is a need for hot melt adhesives with better heat resistance in a number of areas.

Over the years, adhesive formulators have utilized a variety of different polymers as well as other additives in their formulations to obtain a balance of these attributes (adhesion, creep resistance, flexibility, and heat environmental resistance). These polymers include, but are not limited to polyolefins (ethylene- or propene-based polymers), functionalized polyolefins (ethylene or propene copolymers with oxygen containing monomers), or APAOs (ethylene-, propene-, or butene copolymers). However, when formulated into hot melt adhesives, these polymers had certain performance deficiencies. For example, due to their overall wide molecular weight distribution and/or significant low molecular weight portion as observed by various analytical testing methods, APAOs can provide flexibility but can hamper bonding performance at elevated temperatures above 120° F. In fact, their amorphous, non-crystalline structure can often lead to blocking. Blocking is defined as the undesired adhesion of a coated adhesive to substrates it comes into contact with during shipping and/or storage.

In addition to ethylene vinyl acetate (EVA) polymers other polymers have also been utilized in an attempt to improve an adhesive's hot tack and adhesion characteristics. These polymers include, but are not limited to ethylene methyl acrylate copolymers (EMA), ethylene n-butyl acrylate (EnBA), and ethylene methyl acrylate acrylic acid copolymers. These polymers exhibit narrower poly-dispersity when compared to olefin polymers, such as APAO and have lower overall melt peaks as observed by DSC (Differential Scanning calorimetry). This results in an adhesive that is prone to blocking or bond failure at elevated temperatures if not reinforced with some other crystalline additive. While the incorporation of certain waxes or other crystalline additives can increase the elevated temperature resistance of the adhesive, they can reduce the adhesive's hot tack, adhesion, and flexibility.

Adhesive formulators may incorporate other additives or diluents including but not limited to various plasticizers, microcrystalline waxes, and vinyl acetate or maleic anhydride modified waxes to promote adhesion and flexibility. However, these types of formulations typically have insufficient heat resistance above 150° F.

SUMMARY OF THE INVENTION

The present invention relates to hot melt adhesives utilizing a functionalized metallocene catalyzed polyolefin elastomer. More specifically, the composition of the present invention is based on the use of a metallocene catalyzed polyolefin elastomer grafted with maleic anhydride (MAH) functionality in hot melt adhesives for applications that require increased hot tack, adhesion, flexibility, and heat resistance above 150° F.

The invention details hot melt adhesive formulations, consisting of liquid or solid plastizicer, wax, tackifying resin, and metallocene catalyzed polyolefin elastomers grafted with maleic anhydride (MAH). These formulations provide superior hot tack, excellent adhesion characteristics, flexibility, and heat environmental resistance above 150° F., and even above 160° F., over traditional EVA based adhesives, or other polyolefin elastomer based adhesives. The hot melt formulations of this invention also demonstrate improved adhesion to hard-to-bond substrates, such as clear label films, over traditional ethylene vinyl acetate (EVA) based hot melt adhesives. The present adhesive composition may be used specifically for, but is not limited to, rigid packaging applications, hot fill packaging applications, bottle labeling applications, multiwall bag applications, non-structural assembly applications, graphic arts applications, craft, and/or floral applications.

DETAILED DESCRIPTION OF THE INVENTION

The invention provides a hot melt adhesive composition, comprising a blend of the following components for use in hot fill case and carton sealing applications or any applications requiring heat environmental resistance above 150° F., or even above 160° F., and bottle labeling applications requiring good adhesion to hard to bond substrates or films:

About 5% to about 50% by weight of a functionalized polymer comprising a metallocene catalyzed random polyolefin elastomer grafted with maleic anhydride;

About 5% to about 70% by weight of a non-functionalized polymer comprising a metallocene catalyzed random or block polyolefin elastomer as a secondary polymer with a melt index equal to or greater than 15 MI;

About 0% to about 30% by weight of solid or liquid plasticizer;

About 5% to about 30% by weight of a wax;

About 20% to about 70% by weight of a first tackifying resin having a softening point of at least about 95° C., preferably from about 95° C. to about 140° C.;

About 0% to about 20% by weight of an aromatic reinforcing resin having a softening point equal to or higher than 115° C., preferably from about 115° C. to about 160° C.;

About 0.1% to about 5% by weight of a stabilizer;

About 0% to about 3% by weight of auxilliary additives;

Wherein the components total 100% by weight of the composition, and the viscosity of the composition is equal to or less than about 20,000 centipoise at 163° C., preferably equal to or less than about 15,000 centipoise at 163° C., and more preferably equal to or less than about 10,000 centipoise at 163° C.

In a preferred embodiment, the composition may also include about 1% to about 25% by weight of an auxiliary polymer selected from the group consisting of metallocene catalyzed polyolefin elastomers, propylene or ethylene based copolymers, ethylene-alpha-olefin copolymers, olefin block copolymers, ethylene vinyl acetate (EVA), ethylene n-butytl acrylate copolymers, and styrenic block copolymers.

In still another preferred embodiment, the composition includes a wax selected from the group consisting of paraffin wax, microcrystalline wax, and synthetic waxes such as chemically modified waxes, polymerized alpha-olefins, Fisher-Tropsch wax, and polethylene (PE) wax.

Use of the term "functionalized" herein refers to polymers which are chemically modified so as to contain the functional group anhydride on the polymer backbone. In contrast, the term "non-functionalized" refers to polymers which are not chemically modified so as to contain functional groups such as epoxy, silane, sulfonate, amide, and particularly anhydride, on the polymer backbone.

Polyolefin polymers are produced with a very wide range of molecular weights, monomers, densities, crystallinity levels, and functionality. Metallocene catalyzed polyolefin elastomers grafted with maleic anhydride (MAH), offer excellent adhesive characteristics and most importantly provide increased heat environmental resistance (above 150° F. and even above 160° F.), increase flexibility, and excellent adhesion to hard to bond substrates. These MAH grafted polymers can be used as the primary polymer in a hot melt adhesive formulation or can be used as a secondary polymer to provide well balanced adhesive attributes (excellent adhesion, increased flexibility, low viscosity, and heat resistance above 150° F.). An example of these metallocene polymers includes Affinity® GA1000R from Dow Chemical Company. This polymer has a density of 0.878 grams/c.c., a DSC melting point of 68° C. and a Glass Transition Temperature of −58° C. via DSC. The Brookfield Viscosity at 177° C. is 13,000 centipoise (cP) and the Melt Index (ASTM 1238 with 190° C., 2.16 kg weight) is about 660 grams/10 minutes.

The composition also includes, as the secondary polymer, a metallocene catalyzed random or block polyolefin elastomer. The polyolefin elastomer may be polypropylene or polyethylene, blends of different polypropylenes, blends of different polyethylenes, or blends of polypropylenes with polyethylenes.

The polyolefin elastomer secondary polymer may be incorporated into the composition in amounts of from about 5% to about 70% by weight, preferably from about 20% to about 70% by weight, and more preferably from about 30% to about 70% by weight, and most preferably from about 30% to about 60% by weight.

The elastomeric secondary polymer may be a suitable metallocene catalyzed ethylene-based copolymer comprising a major portion by weight of ethylene and a minor portion by weight of a $C_3$ to $C_{18}$ alpha-olefin comonomer, or a metallocene catalyzed propylene-based copolymer comprising a major portion by weight of propylene and a minor portion by weight of a $C_2$ to $C_{18}$ alpha-olefin comonomer, or a blend of the ethylene-based copolymers, the propylene-based copolymers, or one or more of the ethylene-based copolymers with one or more of the propylene-based copolymers. The alpha-olefin comonomer preferably contains 3 to 12 carbon atoms, more preferably contains 4 to 10 carbon atoms, and most preferably contains 4 to 8 carbon atoms. More particularly, the alpha-olefin comonomer may be selected from 1-butene, 1-pentene, 3-methyl-1-butene, 3-methyl-1-pentene, 1-hexene, 4-methyl-1-pentene, 1-dodecene, 3-methyl-1-hexene, 1-octene, and 1-decene. Particularly preferred is 1-butene or 1-octene copolymerized with ethylene.

The alpha-olefin comonomer content in the ethylene-based copolymer is at least 20% by weight and in the range of from 20% to 50% by weight, preferably from 25% to 50% by weight, more preferably from 30% to 50% by weight. Suitable ethylene-based copolymers have a density as determined by ASTM D-792 of 0.90 g/cm³ or less and in the range of from 0.90 g/cm³ to 0.85 g/cm³, preferably between 0.89 g/cm³ and 0.85 g/cm³, and most preferably between 0.885 g/cm³ and 0.85 g/cm³. Suitable ethylene-based copolymers also have a melt index at 190° C. and 2.16 kg as determined by ASTM D1238 of greater than 15 g/10 min. preferably greater than 20 g/10 min., and more preferably greater than 30 g/10 min.

The alpha-olefin comonomer content in the propylene-based copolymer is at least 5%, preferably 5% to 30%, and most preferably 5% to 15% by weight, and the preferred copolymer is a propylene-ethylene copolymer. The propylene-based copolymers have a melt index (measured at 230° C.) of more than 15 g/10 min., preferably more than 20 g/10 min., more preferably greater than 30 g/10 min., and most preferably greater than 50 g/10 min., or more than 100 g/10 min.

"Blends" preferably comprise two or more ethylene-based copolymers or two or more propylene-based copolymers, or one or more ethylene-based copolymers with one or more propylene-based copolymers. Where a blend of copolymers is used, the calculated density of the blend should be less than 0.900 g/cm³, but greater than 0.850 g/cm³. For example, a blend of 70% of an ethylene-based copolymer having a density of 0.870 g/cm³ and 30% of a propylene-based copolymer having a density of 0.885 g/cm³ will result in a final blend having a calculated density of 0.875 g/cm³.

Useful metallocene catalyzed ethylene-based polymers are available from, among others, Dow Chemical Company and Exxon Mobil Chemical Company who are producers of single site or constrained geometry catalyzed polyethylenes. These resins are commercially available under the tradenames AFFINITY™ and ENGAGE™ from Dow Chemical Co. and EXACT™ polymers from ExxonMobil Chemical.

The metallocene catalyzed propylene-based copolymers are available under the VERSIFY™ tradename from The Dow Chemical Company. The manufacture of such polypropylenes is also based on using a metallocene catalyst system and is based on Dow's INSITE™ technology.

The ratio of the primary or base polymer, namely, the metallocene catalyzed random polyolefin elastomer grafted with maleic anhydride to the secondary polymer can vary depending on the physical properties and the adhesion required by the finished adhesive formulation. For example, the ratio can be varied to increase or decrease (i) the elasticity of the adhesive composition; (ii) the adhesion of the adhesive composition; (iii) the low temperature resistance of the adhesive composition; (iv) the high temperature resistance of the adhesive composition; (v) the creep resistance of the adhesive composition; (vi) the cohesive strength of the adhesive composition; (viii) the viscosity characteristics of the adhesive composition and/or (ix) the aging characteristics of the adhesive composition. The relative change (increase or decrease) of the above characteristics is measured relative to the adhesive composition without the addition of the secondary polymer. In general, the percentage of the primary or base polymer will be lower than the amount of the secondary polymer(s) in the formulation.

An important consideration when selecting the secondary polymer is the molecular weight of the secondary polymer and its impact on the viscosity of the finished adhesive. Since these types of formulations generally contain fairly high levels of polymer, it is important that the melt index be relatively high to keep the viscosity of the finished adhesive low. The melt index of the secondary polymer as measured by ASTM D-1238 using a test temperature of 190° C. and a weight of 2.16 kilograms should be greater than 15 grams per minute (g/min). Preferably it is greater than 30 g/min, more preferably greater than 50 g/min, and most preferably it is greater than 100 g/min. When using a blend of secondary polymers, the calculated melt index of the blend should be within these ranges.

The tackifying resins or tackifiers which are used in the hot melt adhesives of the present invention are those which are compatible with the polymers and extend adhesive properties and improve specific adhesion. As used herein, the term "tackifying resin" or "tackifier" include:

(a) Aliphatic and cycloaliphatic petroleum hydrocarbon resins having Ring and Ball softening points of from about 203° F. (95° C.) to about 320° F. (160° C.), as determined by ASTM method E28-58T, the latter resins resulting from the polymerization of monomers consisting primarily of aliphatic and/or cycloaliphatic olefins and diolefins; also included are the hydrogenated aliphatic and cycloaliphatic petroleum hydrocarbon resins; examples of such commercially available resins based on a C5 olefin fraction of this type are Piccotac 95 tackifying resin sold by Hercules Corp. and Escorez 1310LC sold by ExxonMobil Chemical Company;

(b) Aromatic petroleum hydrocarbon resins and the hydrogenated derivatives thereof;

(c) Aliphatic/aromatic petroleum derived hydrocarbon resins and the hydrogenated derivatives thereof;

(d) Aromatic modified cycloaliphatic resins and the hydrogenated derivatives thereof;

(e) Polyterpene resins having a softening point of from about 203° F. (95° C.) to about 284° F. (140° C.), the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins;

(f) Copolymers and terpolymers of natural terpenes, e.g. styrene/terpene, α-methyl styrene/terpene and vinyl toluene/terpene;

(g) Natural and modified rosin such as, for example, gun rosin, wood rosin, tall-oil rosin, distilled rosin, hydrogenated rosin, dimerized rosin and polymerized rosin;

(h) Glycerol and pentaerythritol esters of natural and modified rosin, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall-oil rosin, and the phenolic modified pentaerythritol ester of rosin;

(i) Phenolic-modified terpene resins such as, for example, the resin product resulting from the condensation in an acidic medium of a terpene and a phenol;

Mixtures of two or more of the above described tackifying resins may be required for some formulations. Although a range of 20% to 70% by weight tackifying resin may be used, the preferred amount is from about 25% to about 65% by weight, a more preferred amount is from about 25% to about 50% by weight, and the most preferred amount is from about 30% to about 50% by weight. Tackifying resins which are useful for the present invention can perhaps include polar tackifying resins. However, the choice of available polar tackifying resins is limited in view of the fact that many of the polar resins appear only partially compatible with polyolefin polymers.

As noted above, tackifying resins which are useful within the scope of the present invention comprise about 20% to 70% by weight of the composition. Preferably, the tackifying resins can be selected from any of the nonpolar types, which are commercially available. One class of preferred resins are aliphatic petroleum hydrocarbon resins examples of which are based on C5 olefins. Most preferred are nonpolar products which are hydrogenated di-cyclo-pentadiene (DCPD) based or aromatically modified derivatives thereof with softening points above 95° C. Examples of such resins are Escorez 5340, Escorez 5400 and Escorez 5600 sold by ExxonMobil Chemical company.

Preferably the tackifying resin should have a Ring and Ball softening point (measured by ASTM E28) of at least about 95° C., and preferably between about 95° C. and about 140° C. In general the tackifying resin should be substantially aliphatic to insure compatibility between the resin and the polyolefin polymers.

A solid or liquid plasticizer can be present in the composition of the present invention in amounts of 0% to about 30% by weight, preferably from 0% to about 10% by weight, and most preferably from 0% to about 5% by weight, in order to provide desired viscosity control and to impart flexibility. A suitable plasticizer may be selected from the group which includes the usual plasticizing oils, such as mineral oil, but also olefin oligomers and low molecular weight polymers, as well as vegetable and animal oils and derivatives of such oils. The petroleum derived oils which may be employed are relatively high boiling materials containing only a minor proportion of aromatic hydrocarbons. In this regard, the aromatic hydrocarbons should preferably be less than 30% and more particularly less than 15% of the oil, as measured by the fraction of aromatic carbon atoms. More preferably, the oil may be essentially non-aromatic. The oligomers may be polypropylenes, polybutenes, hydrogenated polyisoprenes, hydrogenated polybutadiens, or the like having average molecular weight between about 350 and about 10,000. Suitable vegetable and animal oils include glycerol esters of the usual fatty acids and polymerization products thereof. The plasticizers that find usefulness in the present invention can be any number of different plasticizers but the inventors have discovered that the mineral oil and liquid polybutenes having average molecular weight less than 5,000 are particularly advantageous. As will be appreciated, plasticizers have typically been used to lower the viscosity of the overall adhesive composition without substantially decreasing the adhesive strength and/or the service temperature of the adhesive as well as to extend the open time and to improve flexibility of the adhesive. For end use applications such as case and carton seal or multiwall bag sealing, there will typical be no plasticizer used in the adhesive. However, a plasticizer will typically be incorporated into a hot melt adhesive intended for use in bottle labeling applications.

Waxes in amounts of about 5% to about 30% by weight, preferably from about 5% to about 20% by weight, and most preferably from about 5% to about 10% by weight, can also be used in the adhesive composition, and are used to reduce the melt viscosity of the hot melt adhesives without appreciably decreasing their adhesive bonding characteristics. These waxes also are used to reduce the open time, or set-up time, of the composition without affecting the temperature performance.

Among the useful wax materials are:
(1) low molecular weight, that is, number average molecular weight (Mn) of about 100 to about 6000 g/mol, polyethylene wax having a hardness value, as determined by ASTM method D-1321, of from about 0.1 to 120 and ASTM softening points of from about 150° F. (65° C.) to 285° F. (140° C.);
(2) petroleum waxes such as paraffin wax having a melting point of from about 122° F. (50° C.) to about 176° F. (80° C.) and microcrystalline wax having a melting point of from about 131° F. (55° C.) to about 212° F. (100° C.), the latter melting points being determined by ASTM method D127-60;
(3) metallocene catalyzed propylene-based wax like those commercialized by Clariant under the name "Licocene";
(4) metallocene catalyzed wax or single-site catalyzed wax like for example those described in U.S. Pat. Nos. 4,914,253, 6,319,979 or WO 97/33921 or WO 98/03603;
(5) synthetic waxes made by polymerizing carbon monoxide and hydrogen such as Fischer-Tropsch wax; and
(6) polyolefin waxes. As used herein, the term "polyolefin wax" refers to those polymeric or long-chain entities comprised of olefinic monomer units. These materials are commercially available from Westlake Chemical Co. under the trade name "Epolene."

The wax materials which are preferred to use in the compositions of the present invention have a Ring and Ball softening point of about 200° F. (93° C.) to about 350° F. (177° C.). As should be understood, each of these waxes is solid at room temperature. Other useful substances include hydrogenated animal, fish and vegetable fats and oils such as hydrogenated tallow, lard, soy oil, cottonseed oil, castor oil, menhadin oil, cod liver oil, and the like, and which are solid at ambient temperature by virtue of their being hydrogenated, have also been found to be useful with respect to functioning as a wax material equivalent. These hydrogenated materials are often referred to in the adhesives industry as "animal or vegetable waxes".

In another embodiment, the adhesive formula may contain a fully aromatic or a substantially fully aromatic endblock reinforcing resin. The aromatic or substantially fully aromatic resin should have softening point equal to or higher than 221° F. (115° C.). Examples of such endblock resins can be prepared from any substantially aromatic monomers having a polymerizable unsaturated group. Typical examples of such aromatic monomers include the styrenic monomers, styrene, alphamethyl styrene, vinyl toluene, methoxy styrene, tertiary butyl styrene, chlorostyrene, etc., coumarone, indene monomers including indene, and methyl indene. The Ring and Ball Softening Points of the aromatic endblock resin is preferably between 115° and 160° C. More preferably, the softening point is between about 115° and 140° C. and most preferably between about 120° and 140° C. Two preferred examples are Plastolyn 240 and Plastolyn 290 available from Eastman Chemical. They have Ring and Ball Softening Points of 120° C. and 140° C., respectively. Preferably, styrene and/or alpha-methyl-styrene and/or vinyl-toluene monomers are used. This reinforcing resin may be present in amounts of 0% to about 20% by weight, i.e. under about 20% by weight, in the adhesive composition, and when incorporated in the composition should preferably be between 1% to about 10% by weight.

The present invention may include a stabilizer in an amount of from about 0% to about 5% by weight. Preferably from about 0.1% to 5% of a stabilizer is incorporated into the composition. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Among the applicable stabilizers are high molecular weight hindered phenols and multifunction phenols, such as sulfur and phosphorous-containing phenols. Hindered phenols are well known to those skilled in the art and may be characterized as phenolic compounds that also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxybenzyl)benzene;
pentaerythirtol tetrakis-3(3,5-di-tert-butly-4-hydroxyphenyl)propionate;
n-octadecyl-3 (3,5-di-tert-butyl-4-hydroxyphenyl)propionate;
4,4'-methylenebis(4-methyl-6-tert butylphenol);
2,6-di-tert-butylphenol;
6-(4-hydroxyphnoxy)-2,4-bis(n-ocytlthio)-1,3,5-triazine;
2,3,6-tris(4-hydroxy-3,5-di-tert-butyl-phenoxy)-1,3,5-triazine;
di-n-octadecyl-3,5-di-tert-butyl-4-hydroxybenzylphosphonate;
2-(n-octylthio)ethyl-3,5-di-tert-butyl-4-hydroxybenzoate; and
sorbitol hexa-3(3,5-di-tet-butyl-4-hydroxy-phenyl)propionate.

Especially preferred as a stabilizer is pentaerythritol tetrakis-3(3,5-di-tert-butyl-4-hydroxyphenol) propionate.

The performance of these stabilizers may be further enhanced by utilizing, in conjunction therewith; (1) synergists such as, for example, thiodipropionate esters and phosphites; examples of these include dilauryl thiodipropionate (DLTDP) and tris(nonylphenyl)phosphite (TNPP), respectively; and (2) chelating agents and metal deactivators as, for example, ethylenediamenetetraacitic acid, slats thereof, and disalicylalpropylenediimine.

It should be understood that other optional auxiliary additives in amounts of 0% to 3% may be incorporated into the adhesive composition of the present invention in order to modify particular physical properties. These may include, for example, inert colorants such as titanium dioxide, as well as fillers, surfactants, other types of polymers, crosslinking agents, nucleating agents, reactive compounds, fire-retardant mineral or organic agents, ultraviolet (UV) or infrared (IR) light absorbing agents, and UV or IR fluorescing agents. Typical fillers include talc, calcium carbonate, clay, silica, mica, wollastonite, feldspar, aluminum silicate, alumina, hydrated alumina, glass microspheres, ceramic microspheres, thermoplastic microspheres, baryte and wood flour. These optional auxiliary additives are well known in this art.

In a preferred embodiment, the composition may also include about 1% to about 25% by weight of an auxiliary polymer selected from the group consisting of metallocene catalyzed polyolefin elastomers, propylene or ethylene based copolymers, ethylene-alpha-olefin copolymers, olefin block copolymers, ethylene vinyl acetate (EVA), ethylene n-butytl acrylate copolymers, and styrenic block copolymers.

A styrenic block copolymer can be used in a hot melt adhesive formula according to the present invention, and may be incorporated into the composition in amounts of from about 1% to about 25% by weight, preferably from about 1% to about 20% by weight, and most preferably from about 1% to about 10% by weight. Among the useful styrenic block copolymers are those having structure A-B, A-B-A, A-(B-A)$_n$-B, or (A-B)$_n$-Y wherein A comprises a polyvinyl aromatic block having a Tg higher than 80° C., B comprises a rubbery midblock having a Tg lower than −10° C., Y comprises a multivalent compound, and n is an integer of at least 3. Examples of these latter block copolymers that are useful in the present hot melt adhesive composition are styrenic block copolymers (SBc) and include styrene-ethylene-butylene-styrene (SEBS), styrene-ethylene-butylene (SEB) styrene-ethylene propylene-styrene (SEPS) and styrene-ethylene propylene (SEP) and styrene-ethylene-ethylene-propylene-styrene (SEEPS or hydrogenated SIBS). The total styrene content of the polymers can be as much as about 30 wt-% of the polymer. Hydrogenating the butadiene midblocks produces rubbery midblocks that are typically converted to ethylene-butylene midblocks. Such block copolymers are available for example from Kraton Polymers, Polimeri Europa, Total Petrochemicals, Dexco, and Kuraray. Multiblock or tapered block copolymers (the A-(B-A)$_n$-B type) are available from Firestone. Block copolymers structures can contain any acrylic monomers or acrylic phase in general, either presenting a high Tg like methyl methacrylate, or having an elastomeric behavior like butyl acrylate. Also, the polymer fraction of the hot melt adhesive can contain one or more other phases, can contain more than one structure or can contain other polymers like copolymers of ethene, propene or other olefinic monomer, or like copolymerization of acrylic monomers. These additional polymers can be homopolymers, or copolymers and can be potentially modified by any during- or after-polymerization modification like grafting or chain-scission. Blends of various styrenic polymers may also be employed so long as the composition retains the desired viscosity, adhesion, flexibility, and heat resistance characteristics of the present invention.

Olefin block copolymers are a class of polyolefin polymer produced using a chain shuttling catalysis technology that produces a linear block structure of the monomers rather than a random polymer produced by Ziegler-Natta or traditional metallocene technology. At this time, they are manufactured by Dow Chemical under the trade name of Infuse®.

The OBC's consist of crystallizable ethylene-octene blocks (hard) with very low comonomer content and high melting temperature alternating with amorphous ethylene-octene blocks (soft) with high comonomer content and low glass transition temperature. This gives the polymer much better elevated temperature resistance and elasticity compared to a typical metallocene random polymer of similar density. While some of the grades of Infuse® have low heat of fusion (approximately 20 Joules/gram) they could not be considered to be amorphous poly-alpha-olefins because the polymer architecture is completely different (i.e. block vs. random) and is specifically produced to have crystalline regions. Not only are they different on a structural basis, they are very different from a physical property standpoint with the OBC's having better elastic recovery, compression set and elevated temperature resistance. As such, they are sold into different markets for different end uses and are not considered equivalent for one another.

OBCs are well known in the art. Details of their synthesis and physical properties can be found in, for example, WO 2006/101966, WO 2006/102016, WO 2006/102150, WO 2009/029476 and U.S. Pat. No. 7,524,911, the disclosures of which are specifically incorporated herein by reference. As is known in the art, the density of the OBC is directly related to its crystallinity, i.e. the higher the density the higher the percent crystallinity. OBC's useful in the present hot melt adhesive composition have densities ranging from 0.860 g/cm$^3$ to 0.890 g/cm$^3$ (g/cc) and a melt index of 1 g/10 min. to 1000 g/10 min, preferably 1 g/10 min to 100 g/10 min. as measured according to ASTM D1238 at 190° C. with a 2.16 kg weight.

Blends of two or more OBC polymers may also be used. For example, a blend of a first OBC polymer and a second OBC polymer that is different than the first OBC polymer may be employed.

OBC polymers are commercially available from Dow Chemical Company under the tradename "Infuse™" in different grades which are distinguishable primarily based on their density and weight percent crystallinity, namely, Infuse 9817, Infuse 9807, Infuse 9530, Infuse 9500 and Infuse 9507.

The hot melt adhesive composition of the present invention may be formulated by using any of the mixing techniques known in the art. A representative example of the prior art mixing procedure involves placing all the components, except the polymers, in a jacketed mixing kettle, such as a jacketed heavy duty mixer of the Baker-Perkins or Day type, equipped with a rotor, and thereafter raising the temperature of the mixture to a range from 248° F. (120° C.) to 400° F. (205° C.) to melt the contents. It should be understood that the precise temperature to be used in this step would depend on the melting points of the particular ingredients. The polymers are subsequently introduced to the kettle under agitation and the mixing is allowed to continue until a consistent and uniform mixture is formed. The content of the kettle is protected with inert gas such as carbon dioxide or nitrogen during the entire mixing process, and a vacuum may be applied to remove any entrapped gases, particularly air.

The viscosity of the adhesive composition of the present invention is equal to or lower than 20,000 centipoise (cP) at 325° F. (163° C.). Preferably, it should be lower than 15,000 centipoise (cP) at 325° F. (163° C.), and most preferably should be lower than 10,000 centipoise (cP) at 325° F. (163° C.) as determined by employing a Brookfield Thermocel or other appropriate viscometer and utilizing the testing techniques which are set forth in ASTM Method D3236-88. The viscosity of the finished adhesive can vary widely depending on the end use of the adhesive. For example, hot melt adhesives used for bottle labeling applications are generally quite low in viscosity, for example less than about 2,000 centipoise (cP) at 325° F., and more preferably less than 1,000 centipoise (cP) at 325° F. On the other hand, hot melts used for case and carton sealing are typically less than about 10,000 centipoise (cP) at 325° F.

EXAMPLES

Two tests were used to assess the elevated temperature resistance of hot melt adhesive composition samples. The first is a Mandrel Test and the second is an Institute of Packaging Professionals (IOPP) Test.

In order to perform the Mandrel Test, two strips of a 42 pound/ream kraft paper are required. One piece should be cut to 3 inches×6 inches and the second is cut to 1 inch×6 inches. A bead of adhesive of about ⅛ inch in diameter is applied lengthwise down the center of the 3 inch×6 inch piece at the typical application temperature of 350° F. After a 2 second open time, the 1 inch×6 inch piece is placed on top of the bead of adhesive and compressed using a standard 4.5 pound PSTC (Pressure Sensitive Tape Council) roller by rolling over the adhesive bead once. The test sample is allowed to age overnight at room temperature.

After aging, ½ inch of the laminate is cut from each end to ensure that there is no adhesive squeezed out which could effect the bond. The laminate is taped, top and bottom, to the outside of a standard 3 inch ID core. The only thing holding the outer 1 inch×5 inch piece of Kraft paper in place is the bead of adhesive. Samples are placed in environmental chambers at various temperatures (140° F., 150° F., 160° F., etc.) for 24 hours. After 24 hours has elapsed, the samples are checked while still in the chamber for delamination. The percent delamination is noted along with the failure mode. If the sample is still bonded, it is peeled apart by hand to determine the amount of fiber tear.

Samples were also evaluated by an IOPP Test, known in the industry as "Suggested Test Method For Determining The Heat Stress Resistance Of Hot Melt Adhesives". In this test, two samples of corrugated board are glued together with a hot melt adhesive. The test is orientated to mimic a case flap under stress. Test samples are placed in an isothermal oven for 24 hours at 140° F. The bond on the test samples is evaluated as pass or fail with the failure mode noted. A more detailed description of the IOPP Test can be found in the Packaging Adhesives and Adhesion Committee (PAAT) Committee Reports of the Institute of Packaging Professionals at www.iopp.org.

The Examples in Tables 1A, 1B and 1C demonstrate the heat resistance performance advantages as a result of the incorporation of functionalized polyolefin elastomers grafted with maleic anhydride. The compositions labeled PA-1 and PA-2 are commercial hot melt adhesives used in case and carton sealing applications and are available from Bostik, Inc. while Comparative samples 1 through 13 show various formulations based on blends of non-functionalized metallocene catalyzed polyolefin (Affinity GA1900). None of these pass the Mandrel Test at 160° F. for 24 hours. Comparing Comparative sample 13 with Inventive sample 1, the Inventive sample 1 containing the maleic modified polyolefin polymer (Affinity GA1000R) has dramatically improved elevated temperature properties. The same is true comparing Comparative sample 14 with Inventive sample 2, and Comparative sample 15 with Inventive sample 3. It is important to note that the viscosity does not significantly change by adding the maleic modified polymer. Surprisingly, the Ring and Ball softening point does not increase even though the Inventive samples have much higher heat resistance properties.

Table 2 shows several examples to evaluate the bond force using a standard 180 Degree Peel Test measured using an Instron Tensile Tester with a crosshead speed of 12 inches/minute at room temperature on hard to bond clear label films. Hard to bond clear label films include films such as clear polypropylene, polyethylene, polypropylene/polyethylene, or metalized oriented polypropylene label films. The composition labeled PA-3 is a commercial hot melt adhesive used in bottle labelling applications and is available from Bostik, Inc. Comparing PA-3 and Inventive sample 3, it is clear that Inventive sample 3 provides much higher peel force on a polypropylene film label. Also, it should be noted that comparing compositions PA-3 and Comp. 1 with inventive examples Inv.1, Inv.2 and Inv.3, it is clear that inventive examples Inv.1, Inv.2 and Inv.3 maintain high peel strength at 35° F. whereas PA-3 and Comp. 1 both delaminated.

TABLE 1A

| | Heat Environmental Resistance > 160° F. | | | | | | |
|---|---|---|---|---|---|---|---|
| | PA-1 | PA-2 | Comp. 1 | Comp. 2 | Comp. 3 | Comp. 4 | Comp. 5 |
| VISCOWAX 114 | | | | | | | |
| CWP/CHU 561 Polyethylene | | | | | | | |
| Epolene C-10 | | | 14.2 | 10 | 15 | 15 | 15 |
| Nynas 222B | | | 8.1 | | 6.3 | 6.3 | 6.3 |
| ESCOREZ 5637 | | | | | | | |
| Eastotac H115L | | | | | | | |
| Eastotac H142R | | | 10 | 10 | | | 29.5 |
| Wingtack Extra | | | 43.4 | 49.5 | 49.5 | 49.5 | 20 |
| AFFINITY G1900 | | | 13.8 | 20 | 18.7 | 28.7 | 28.7 |
| INFUSE 9817 | | | 10 | 10 | 10 | | |
| INFUSE 9807 | | | | | | | |
| AFFINITY GA1000R | | | | | | | |
| IRGANOX 1010 | | | 0.5 | 0.5 | 0.5 | 0.5 | 0.5 |
| TOTAL | | | 100 | 100 | 100 | 100 | 100 |
| Mandrel test @ 160° F., 24 Hours | Fail | Fail | Fail | Fail | Fail | Fail | Fail |
| Mandrel test @ 170° F., 24 Hours | Fail | Fail | Fail | Fail | Fail | Fail | Fail |
| Mandrel test @ 180° F., 24 Hours | | | | | | | |
| Standard IOPP Test @ 140° F., 24 Hours | Fail | Fail | | | | | |
| Viscosity @ 250° F. (cP) | | | | | | 6,500 | 8,637 |
| Viscosity @ 275° F. (cP) | 3,125 | 2,625 | | | | 3,700 | 4,650 |
| Viscosity @ 300° F. (cP) | 1,925 | 1,650 | 6,150 | 9,600 | 7,212 | 2,225 | 2,737 |
| Viscosity @ 325° F. (cP) | 1,250 | 1,050 | 3,775 | 5,975 | 4,662 | 1,450 | 1,595 |
| Viscosity @ 350° F. (cP) | 825 | 750 | 2,460 | 3,862 | 3,450 | 980 | 985 |

TABLE 1B

| | Comp. 6 | Comp. 7 | Comp. 8 | Comp. 9 | Comp. 10 | Comp. 11 | Comp. 12 |
|---|---|---|---|---|---|---|---|
| VISCOWAX 114 | | | | | | 12 | 12 |
| CWP/CHU 561 Polyethylene | | | | | | | |
| Epolene C-10 | 15 | 15 | 15 | 15 | 15 | 15 | 15 |
| Nynas 222B | | | 12.3 | 12.3 | 14.5 | | |
| ESCOREZ 5637 | | | | | | | |
| Eastotac H115L | | 59.5 | | | | | |
| Eastotac H142R | 10 | | 1.6 | 46.7 | | | |
| Wingtack Extra | 49.5 | | 45.1 | | 45 | 47 | 47 |
| AFFINITY G1900 | 20 | 25 | 20 | 20 | 20 | 20 | 25.5 |
| INFUSE 9817 | 5 | | 5.5 | 5.5 | | 5.5 | |
| INFUSE 9807 | | | | | 5 | | |
| AFFINITY GA1000R | | | | | | | |
| IRGANOX 1010 | 0.5 | 0.5 | 0.5 | 0.5 | 0.5 | 0.5 | 0.5 |
| TOTAL | 100 | 100 | 100 | 100 | 100 | 100 | 100 |
| Mandrel test @ 160° F., 24 Hours | Fail | Fail | Fail | Fail | Fail | Fail | Fail |
| Mandrel test @ 170° F., 24 Hours | Fail | Fail | Fail | Fail | Fail | Fail | Fail |
| Mandrel test @ 180° F., 24 Hours | | | | | | | |
| Standard IOPP Test @ 140° F., 24 Hours | | | | | | | |
| Viscosity @ 250° F. (cP) | | | 8,500 | 14,070 | 7,087 | 10,130 | 5,000 |
| Viscosity @ 275° F. (cP) | | | 4,875 | 8,050 | 4,225 | 6,012 | 2,925 |
| Viscosity @ 300° F. (cP) | 5,063 | 5,063 | 2,975 | 4,900 | 2,625 | 3,800 | 1,750 |
| Viscosity @ 325° F. (cP) | 3,063 | 3,063 | 1,925 | 3,200 | 1,695 | | 1,213 |
| Viscosity @ 350° F. (cP) | 1,975 | 1,975 | 1,275 | 2,055 | 1,125 | | 800 |

TABLE 1C

|  | Comp. 13 | Inv. 1 | Inv. 2 | Inv. 3 | Inv. 4 | Comp. 14 | Comp. 15 | Comp 16 |
|---|---|---|---|---|---|---|---|---|
| VISCOWAX 114 |  |  | 6 | 11 |  | 6 | 11 | 11 |
| CWP/CHU 561 Polyethylene | 12 | 12 |  |  |  |  |  |  |
| Epolene C-10 | 15 | 15 | 15 | 15 | 15 | 15 | 15 | 15 |
| Nynas 222B |  |  | 5 |  | 11 | 5 |  |  |
| ESCOREZ 5637 |  | 47 |  |  |  |  |  |  |
| Eastotac H115L |  |  |  |  |  |  |  | 48.5 |
| Eastotac H142R |  |  | 48.5 | 48.5 | 48.5 | 48.5 | 48.5 |  |
| Wingtack Extra | 47 |  |  |  |  |  |  |  |
| AFFINITY G1900 | 25.5 | 20 | 20 | 20 | 20 | 25 | 25 | 20 |
| INFUSE 9817 |  |  |  |  |  |  |  |  |
| INFUSE 9807 |  |  |  |  |  |  |  |  |
| AFFINITY GA1000R |  | 5.5 | 5 | 5 | 5 |  |  | 5.0 |
| IRGANOX 1010 | 0.5 | 0.5 | 0.5 | 0.5 | 0.5 | 0.5 | 0.5 | 0.5 |
| TOTAL | 100 | 100 | 100 | 100 | 100 | 100 | 100 | 100 |
| Mandrel test @ 160° F., 24 Hours | Fail | Pass with 100% fiber destruct | Pass with 100% fiber destruct | Pass with 100% fiber destruct | Pass with 100% fiber destruct | Cohesive Failure | Cohesive Failure | Cohesive Failure |
| Mandrel test @ 170° F., 24 Hours | Fail | Pass with 100% fiber destruct | Pass with 100% fiber destruct | Pass with 100% fiber destruct | Pass with 100% fiber destruct | Fail | Fail | Fail |
| Mandrel test @ 180° F., 24 Hours |  | Pass with 100% fiber destruct | Pass with 80% fiber destruct | Pass with 100% fiber destruct | Fail | Fail | Fail | Fail |
| Standard IOPP Test @ 140° F., 24 Hours |  | Not tested | Pass with 100% fiber destruct | Pass with 100% fiber destruct | Fail | Fail | Fail | Not tested |
| Viscosity @ 250° F. (cP) | 4,425 | 4,612 | 8,600 | 8,875 | 7,900 | 8,125 |  |  |
| Viscosity @ 275° F. (cP) | 2,375 | 2,460 | 4,662 | 4,875 | 4,362 | 4,500 | 5,025 |  |
| Viscosity @ 300° F. (cP) | 1,488 | 1,580 | 2,295 | 2,850 | 2,480 | 2,625 | 2,925 | 2,475 |
| Viscosity @ 325° F. (cP) | 988 | 1,075 | 1,700 | 1,825 | 1,542 | 1,650 | 1,875 | 1,612 |
| Viscosity @ 350° F. (cP) | 675 |  | 1,147 | 1,200 | 1,002 | 1,100 | 1,220 | 1,087 |

TABLE 2

| Bottle Labeling | | | | | |
|---|---|---|---|---|---|
|  | PA-3 | Inv. 1 | Inv. 2 | Comp. 1 | Inv. 3 |
| CWP/CHU 561 Polyethylene |  | 6 | 6 | 6 | 4 |
| Epolene C-10 |  | 15 | 15 | 15 | 14 |
| Nynas 222B |  | 15 | 15 | 15 | 18 |
| Eastotac H142R |  | 38.5 | 38.5 | 38.5 |  |
| Escorez 5400 |  |  | 10 | 10 | 48.5 |
| AFFINITY G1900 |  | 20 | 10 | 15 | 10 |
| AFFINITY GA1000R |  | 5 | 5 | 5 | 5 |
| IRGANOX 1010 |  | 0.5 | 0.5 | 0.5 | 0.5 |
|  |  | 100 | 100 | 100 | 100 |
| Mandrel test @ 140° F. within 24 Hours | Pass | Pass | Pass | Pass | Pass |
| Average Peel Force (PP clear Labels, 1.0 Mil, 1 × 1 inch) |  |  |  |  |  |
| Initial Force @ Rm Temp (Grams/inch) | >1,000 | >1,000 | >1,000 | >1,000 | >1,000 |
| After 24 Hours @ 35° F. (Qualitative Hand Peel) | Delaminated | Good | Good | Delaminated | Very good |
| Average Peel Force (Metalized OPP Film, 1.0 Mil, 1 × 1 inch) |  |  |  |  |  |
| Initial Force @ Rm Temp (Grams/inch) | >200.0 | >200.0 | >200.0 | >200.0 | >200.0 |
| Viscosity @ 250° F. (cP) | 1,450 | 3,775 | 2,438 | 2,438 | 1,625 |
| Viscosity @ 275° F. (cP) | 875 | 2,245 | 1,400 | 1,375 | 975 |
| Viscosity @ 300° F. (cP) | 500 | 1,420 | 850 | 850 | 613 |
| Viscosity @ 325° F. (cP) |  | 940 | 550 | 550 | 413 |
| Viscosity @ 350° F. (cP) |  | 650 |  |  |  |
| Softening Point (Herzog R&B) | 182.0° F. |  |  | 187.0° F. |  |

TABLE 2-continued

Bottle Labeling

| Raw Material Name | Type | Supplier |
|---|---|---|
| Mineral Oils | | |
| Nynas 222B | Hydrotreated Naphthenic Process Oil | Nynas |
| Kaydol | White Mineral Oils | Sonneborn, Inc. |
| Waxes | | |
| Viscowax 114 | Polyethylene Wax | Innospec Leuna GmbH |
| CWP/CHU 561 Polyethylene Wax | Polyethylene Wax | Hase Petroleum Wax Co. |
| Epolene C-10 | Polyolefin wax | Westlake Chemical Corporation |
| Tackifying Resins | | |
| Eastotac H115L | Hydrogenated Aliphatic Hydrocarbon resin | Eastman |
| Eastotac H142R | Partially Hydrogenated Aliphatic Hydrocarbon resin | Eastman |
| Wingtack Extra | Aromatic modified C5 Hydrocarbon resin | Cray Valley USA, LLC |
| Escorez 5400 | Hydrogenated cycloaliphatic HC | ExxonMobil |
| Escorez 5637 | Aromatic modified, cycloaliphatic HC | ExxonMobil |
| Olefin Polymer | | |
| Affinity GA 1900 | Ethylene-Octene copolymer | Dow |
| Affinity GA 1000R | Maleic anhydride (MAH) ethylene-octene copolymer | Dow |
| Infuse 9817 | OBC (Olefin Block Copolymer) | Dow |
| Infuse 9807 | OBC (Olefin Block Copolymer) | Dow |
| Antioxidant | | |
| Irganox 1010 | Hindered Phenol | Ciba Specialty |

| Raw Material Name | Physical Properties & Test Methods | |
|---|---|---|
| Mineral Oils | Viscosity @ 40° C. | |
| Nynas 222B | 90-110 cP | ASTM D445 |
| Kaydol | 64.5-69.7 cP | ASTM D445 |
| Waxes | Drop Point, ° C. | |
| Viscowax 114 | 112.0-117.0 | DGF M-111 3 |
| | Softening Point, ° C. | |
| CWP/CHU 561 Polyethylene Wax | 110.0-115.0 | ASTM D36 |
| Epolene C-10 | 101.0 | ASTM D6090 |
| Tackifying Resins | Ring & Ball Softening Point, ° C. | |
| Eastotac H115L | 110.0-120.0 | ASTM E28 |
| Eastotac H142R | 138.0-146.0 | ASTM E28 |
| Wingtack Extra | 94.0-100.0 | ISO 4625 |
| Escorez 5400 | 100.0-106.0 | ETM 22-24 |
| Escorez 5637 | 127.0-133.0 | ETM 22-24 |

| Olefin Polymer | Density, g/cm | | Melt Index | | Melt Enthalpy (J/g) Bostik Data |
|---|---|---|---|---|---|
| Affinity GA 1900 | 0.870 g/cm$^3$ | ASTM D792 | 1,000 g/10 min (190° C./2.16 Kg) | ASTM D1238 | 69.3 |
| Affinity GA 1000R | 0.878 g/cm$^3$ | ASTM D792 | 660 g/10 min (190° C./2.16 Kg) | ASTM D1238 | |
| Infuse 9817 | 0.877 g/cm$^3$ | ASTM D792 | 15.0 g/10 min (190° C./2.16 Kg) | ASTM D1238 | 42.6 |

TABLE 2-continued

| Bottle Labeling | | | | | |
|---|---|---|---|---|---|
| Infuse 9807 | 0.866 g/cm$^3$ | ASTM D792 | 15.0 g/10 min (190° C./2.16 Kg) | ASTM D1238 | 23.0 |

| Antioxidant | Flash Point, ° C. | Melting Range (° C.) |
|---|---|---|
| Irganox 1010 | 297 | 110-125 |

We claim:

1. A hot melt adhesive composition, comprising a blend of the following components:
    about 5% to about 50% by weight of a functionalized polymer comprising a metallocene catalyzed random polyolefin elastomer grafted with maleic anhydride;
    about 5% to about 70% by weight of a non-functionalized polymer comprising a metallocene catalyzed random elastomeric ethylene copolymer as a secondary polymer with a melt index at 190° C. and 2.16 kg load of at least 1,000 g/10 min;
    about 0% to about 30% by weight of solid or liquid plasticizer;
    about 5% to about 30% by weight of waxes, wherein the waxes comprise a polyolefin wax and a polyethylene wax;
    about 20% to about 70% by weight of a tackifying resin having a softening point of at least about 95° C.;
    about 0.1% to about 5% by weight of a stabilizer; and
    about 0% to about 3% by weight of auxilliary additives;
    wherein the components total 100% by weight of the composition, and the viscosity of the composition is equal to or less than about 20,000 centipoise at 163° C.

2. The composition of claim 1 further including about 1% to about 25% by weight of an auxiliary polymer selected from the group consisting of propylene copolymers, ethylene copolymers, ethylene/alpha-olefin copolymers, olefin block copolymers, ethylene vinyl acetate (EVA), ethylene n-butyl acrylate copolymers, and styrenic block copolymers.

3. The composition of claim 1 wherein said tackifying resin has a softening point of from about 95° C. to about 140° C.

4. The composition of claim 1 wherein said composition has a viscosity equal to or less than 10,000 centipoise at 163° C.

5. The composition of claim 1 wherein said composition passed the Standard IOPP Test after 24 Hours at 140° F., under stress at 250 grams.

6. The composition of claim 1 wherein said composition passed the bond retention test after 24 hours using the Mandrel Test Method at a temperature equal to or higher than 160° F.

7. The composition of claim 1 wherein said composition has an initial average peel force equal to or greater than 200 grams at room temperature using hard to bond clear label films selected from the group consisting of clear polypropylene, polyethylene, polypropylene/polyethylene, and metalized oriented polypropylene label films.

8. The composition of claim 1, wherein said tackifying resin is present in an amount of about 25% to about 65% by weight.

9. The composition of claim 1, wherein said tackifying resin is present in an amount of about 30% to about 50% by weight.

* * * * *